(No Model.)
C. W. GOODRICH.
SHARPENER FOR LAWN MOWERS.
No. 601,510. Patented Mar. 29, 1898.
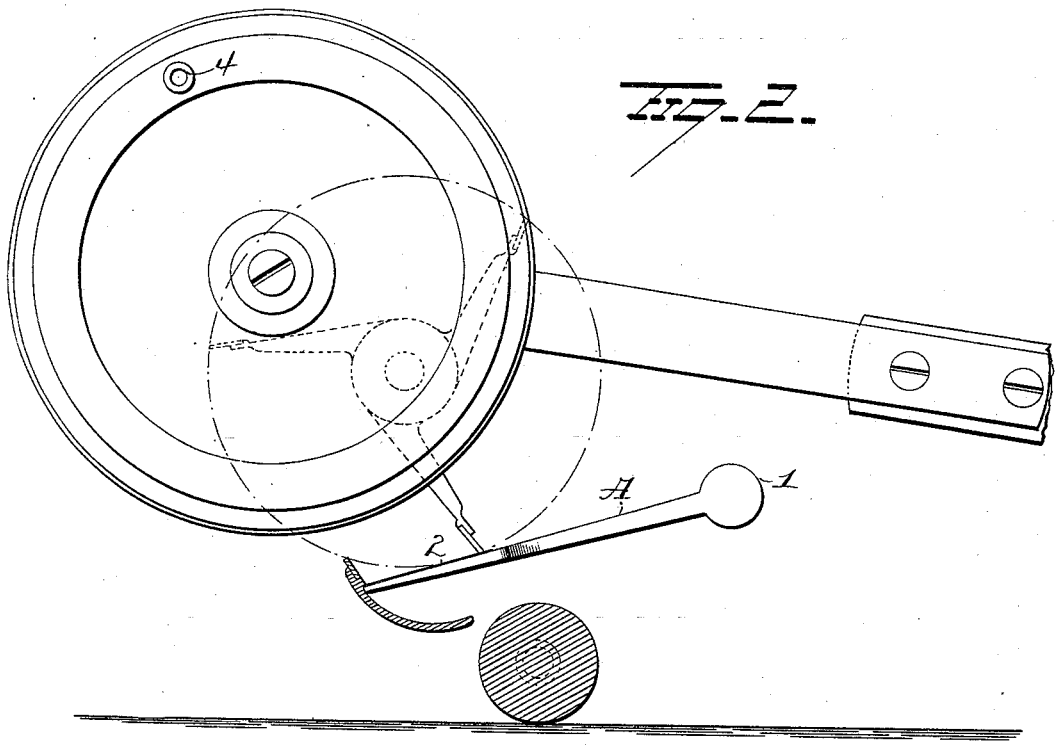
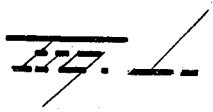
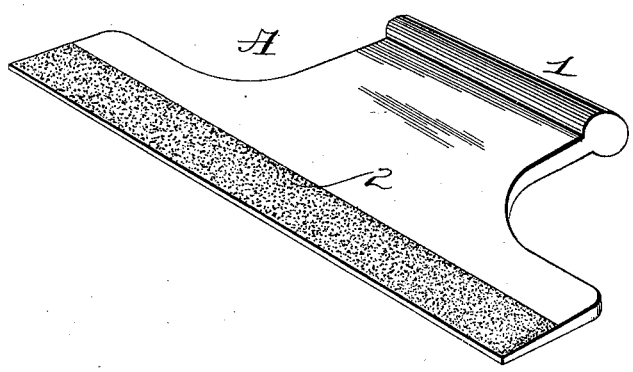
WITNESSES
E. J. Nottingham
G. F. Downing
INVENTOR
C. W. Goodrich
By H. A. Seymour
Attorney
THE NORRIS PETERS CO., PHOTO-LITHO., WASHINGTON, D. C.

UNITED STATES PATENT OFFICE.

CHARLES W. GOODRICH, OF GARDINER, MAINE.

SHARPENER FOR LAWN-MOWERS.

SPECIFICATION forming part of Letters Patent No. 601,510, dated March 29, 1898.

Application filed August 24, 1897. Serial No. 649,307. (No model.)

*To all whom it may concern:*

Be it known that I, CHARLES W. GOODRICH, of Gardiner, in the county of Kennebec and State of Maine, have invented certain new and useful Improvements in Sharpeners for Lawn-Mowers; and I do hereby declare the following to be a full, clear, and exact description of the invention, such as will enable others skilled in the art to which it appertains to make and use the same.

My invention relates to an improvement in sharpening devices for lawn-mowers, the object being to provide a simple, cheap, and effective device adapted to be held in contact with the knives of a lawn-mower, whereby sharpening of the cutters may be quickly and effectively accomplished without disconnecting any of the mechanism of the lawn-mower.

With this end in view my invention consists in certain novel features of construction and combinations of parts, as will hereinafter be more fully described, and pointed out in the claim.

In the accompanying drawings, Figure 1 represents a view of my improvement, and Fig. 2 is a view of the same applied in its operative position.

A represents a plate, preferably triangular in cross-section and of a length approximately corresponding to the length of the cutters or knives of a lawn-mower. This plate is provided centrally with a rearwardly-extending handle 1 and along the edge opposite the handle with a sheet or strip of emery or other abrading material 2, which latter is located on the upper face of said plate and extends the entire length of said plate and from its outer edge to a suitable point rearwardly.

The operative position of the device above described is clearly illustrated in Fig. 2 of the drawings. In this figure the mower is turned or tilted on the grass-roller, so as to bring the operating-wheels of the mower above the floor or ground, the end of the handle resting on the floor or ground. This brings the cutters or knives well up above the floor. In the screw-hole usually found in the operating-wheels of all lawn-mowers is screwed the operating-handle 4, by means of which said wheels are rotated in a direction reverse of that traveled when the mower is cutting grass. The sharpener is now introduced above the grass-roller, with its forward end resting in contact with the bed-plate of the machine, and is held by handle 1, so as to bring the emery surface 2 in contact with the inclined or beveled faces of the cutters or knives when the latter are revolved. By revolving the operating-wheels in a direction reverse to that traveled when the mower is in its normal position the knives or cutters will also travel in a reverse direction and by their constant contact, in the manner above described, with the emery surface of the sharpener will be quickly and effectively sharpened.

Having fully described my invention, what I claim as new, and desire to secure by Letters Patent, is—

As an article of manufacture a lawn-mower sharpener comprising a straight-blade portion provided with a grinding-surface and having a handle at one end by which it is tilted and held in the required position for sharpening the knives as they are revolved against the grinding-surface.

In testimony whereof I have signed this specification in the presence of two subscribing witnesses.

CHARLES W. GOODRICH.

Witnesses:
FRANK E. BOSTON,
HENRY FARRINGTON.